Feb. 18, 1969   D. C. McCRAY ET AL   3,427,796
FRUIT PICKER
Filed Oct. 23, 1965  Sheet 1 of 7
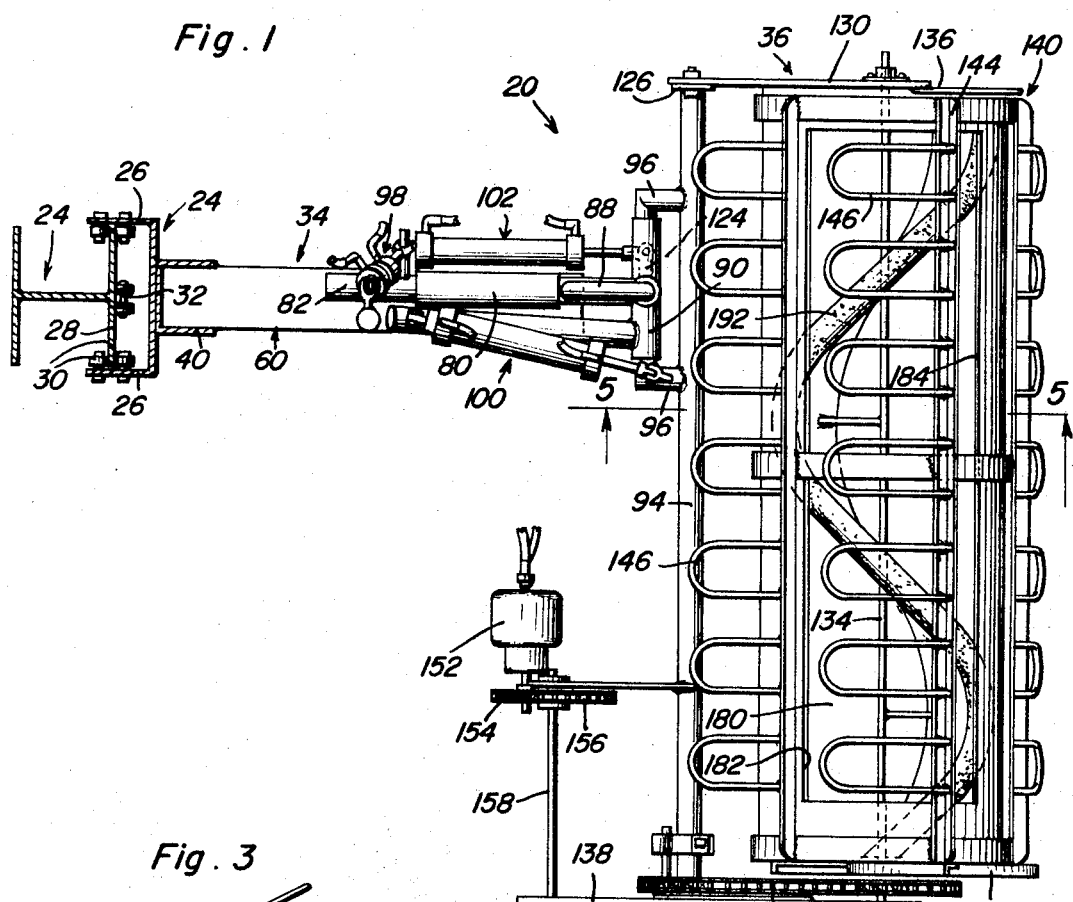
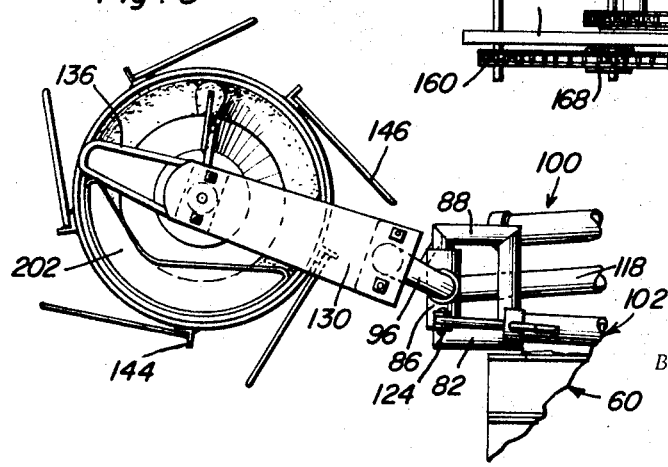
Donald C. McCray
Donald E. McCray
Allan S. McCray
INVENTORS

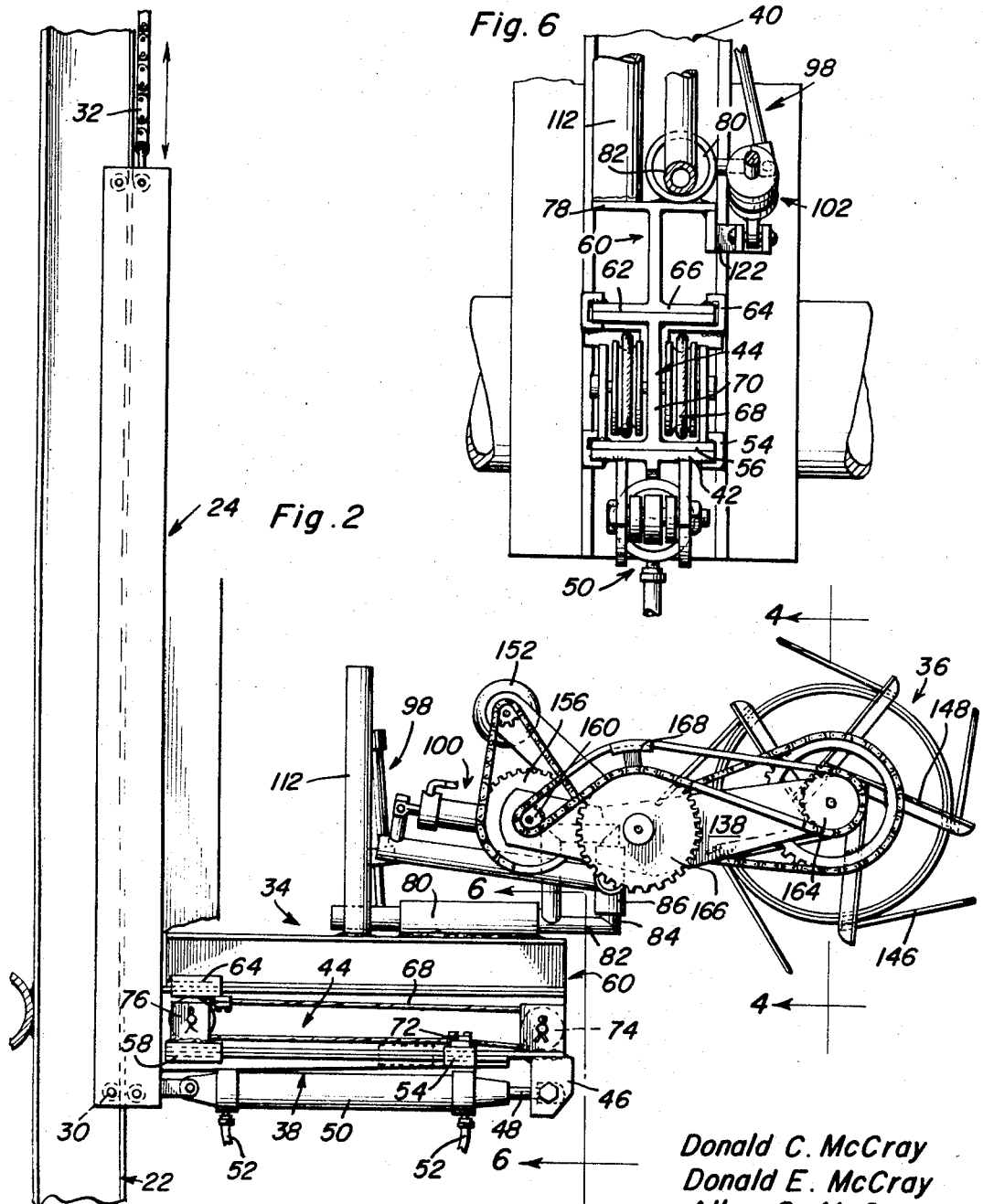

Donald C. McCray
Donald E. McCray
Allan S. McCray
INVENTORS

Donald C. McCray
Donald E. McCray
Allan S. McCray
INVENTORS

Donald C. McCray
Donald E. McCray
Allan S. McCray
INVENTORS

Feb. 18, 1969   D. C. McCRAY ET AL   3,427,796
FRUIT PICKER

Filed Oct. 23, 1965   Sheet 6 of 7

Donald C. McCray
Donald E. McCray
Allan S. McCray
INVENTORS

Donald C. McCray
Donald E. McCray
Allan S. McCray
INVENTORS

United States Patent Office 3,427,796
Patented Feb. 18, 1969

3,427,796
FRUIT PICKER
Donald C. McCray, 226 Coral Drive; Donald E. McCray, 222 Coral Drive; and Allan S. McCray, 226 Coral Drive; all of Hudson, Fla. 33568
Filed Oct. 23, 1965, Ser. No. 502,853
U.S. Cl. 56—328                    15 Claims
Int. Cl. A01g 19/08

ABSTRACT OF THE DISCLOSURE

A fruit picker including an adjustably mounted picker head. The picker head is adapted to rotate in a first direction while individual gripping roller or rollers carried by the head rotate in the opposite direction so as to grip and twist fruit free as the head is advanced into the foliage of a tree. Comb-like members are provided to initially receive and direct the fruit, the picker head also including foliage guards to deflect the foliage and breaker bar means to assist in the actual severing of the fruit.

---

The instant invention is concerned with new and useful improvements in fruit picking apparatus of the type which is to be introduced directly into the fruit bearing members of trees, bushes, vines, or the like.

It is a primary object of the instant invention to provide fruit picking apparatus wherein the fruit will, upon being engaged by the apparatus, be firmly gripped and twisted or spun from the stem, thereby avoiding the damage to the fruit and foliage normally resulting from a direct pulling of the fruit in the manner of conventional fruit picking apparatus.

Another highly significant object of the instant invention is to provide fruit picking apparatus which can be vertically, horizontally, and angularly adjusted so as to facilitate the movement into the fruit bearing foliage so as to reduce to a minimum any possible foliage damage, while at the same time providing for maximum maneuverability.

Another important object of the instant invention is to provide fruit picking apparatus wherein fruit guiding combs or bars are provided so as to properly orientate and introduce the fruit to the twisting rollers.

Also, it is an object of the invention to provide fruit picking apparatus which is incorporated into a relative compact unit enabling it to be mounted on a conventional tractor vehicle through an extensible boom with the control of the apparatus being either from the tractor itself or a control platform mounted adjacent the apparatus.

Further, it is an object of the instant invention to provide a device which while capable of gently handling and removing fruit, possesses a degree of structural stability which insures trouble free continuous operation in the field.

Furthermore, in order to effect the smooth twisting of the fruit from the tree, it is a particular object of the instant invention to provide a fruit picking device wherein the picker head rotates, as a unit, in one direction while the contained roller or rollers rotate in the opposite direction in a manner so as to develop a twisting motion therebetween which in turn results in a firm gripping of the individual fruits and a twisting movement of the fruit.

In achieving these objects, it is basically contemplated that the fruit picker of the instant invention include a picker head adjustably mounted for movement in a variety of directions so as to enable a proper introduction of the picker head into the fruit bearing foliage. This adjustment is to preferably include both a vertical adjustment along a tractor mounted boom, and a horizontal adjustment laterally of the boom, in addition to, in some instances, an angular adjustment of the head about various horizontal and vertical axes. Further, the picker head unit itself is specifically provided so as to rotate in a single direction, for example counterclockwise, while the individual gripping roller or rollers carried by head rotate in the opposite direction so as to firmly grip and carefully twist the fruit from the stems as the head unit is advanced into the foliage of a tree. Further, in order to assist in the guiding of the fruit, various comb-like members are provided which initially receive and direct the fruit, in conjunction with foliage guards so as to deflect foliage, and breaker bar means to assist in the actual severing of the fruit. Finally, discharge means are to be associated with each of the particular picker head units so as to effectively receive the severed fruit and direct the fruit to a normally remote collection point.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the fruit picking device comprising the instant invention;

FIGURE 2 is a side elevational view of the fruit picker;

FIGURE 3 is an elevational view of the picker head unit taken from the side opposite that shown in FIGURE 2;

FIGURE 6 is an enlarged cross-sectional view taken substantially on a plane passing along line 6—6 in FIGURE 2;

Figure 4:
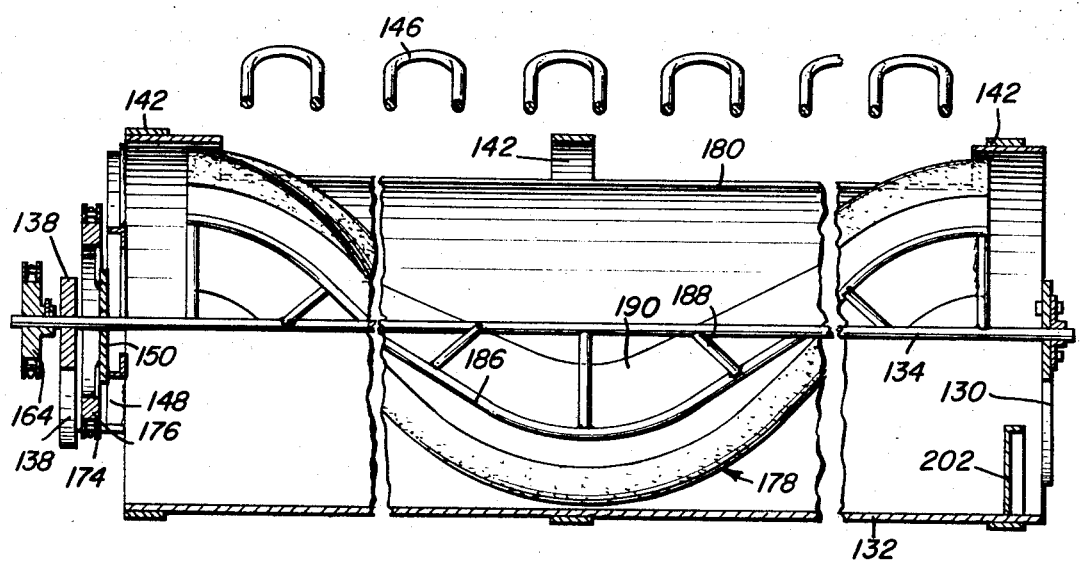
FIGURE 4 is an enlarged partial cross-sectional view taken substantially on a plane pasing along line 4—4 in FIGURE 2.
Figure 5:
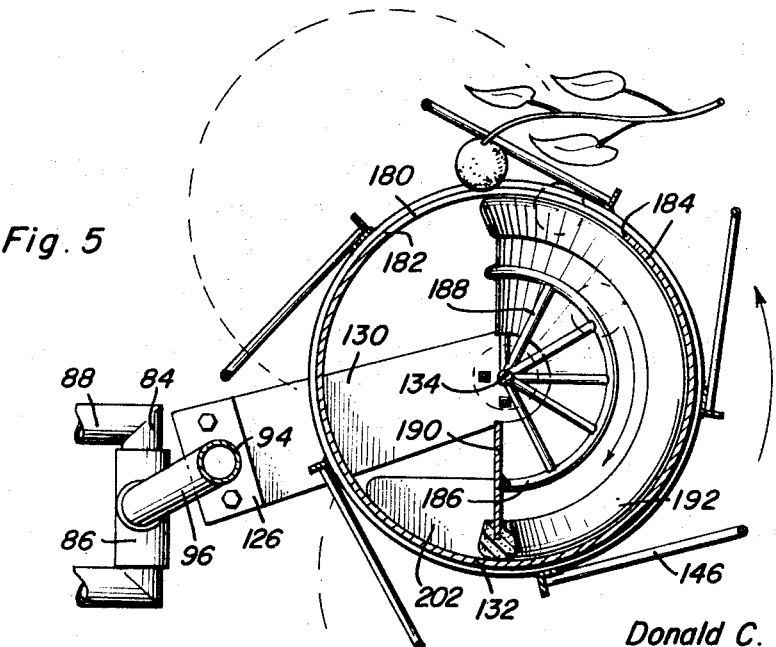
FIGURE 5 is an enlarged partial cross-sectional view taken substantially on a plane pasing along line 5—5 in FIGURE 1.
Figure 7:
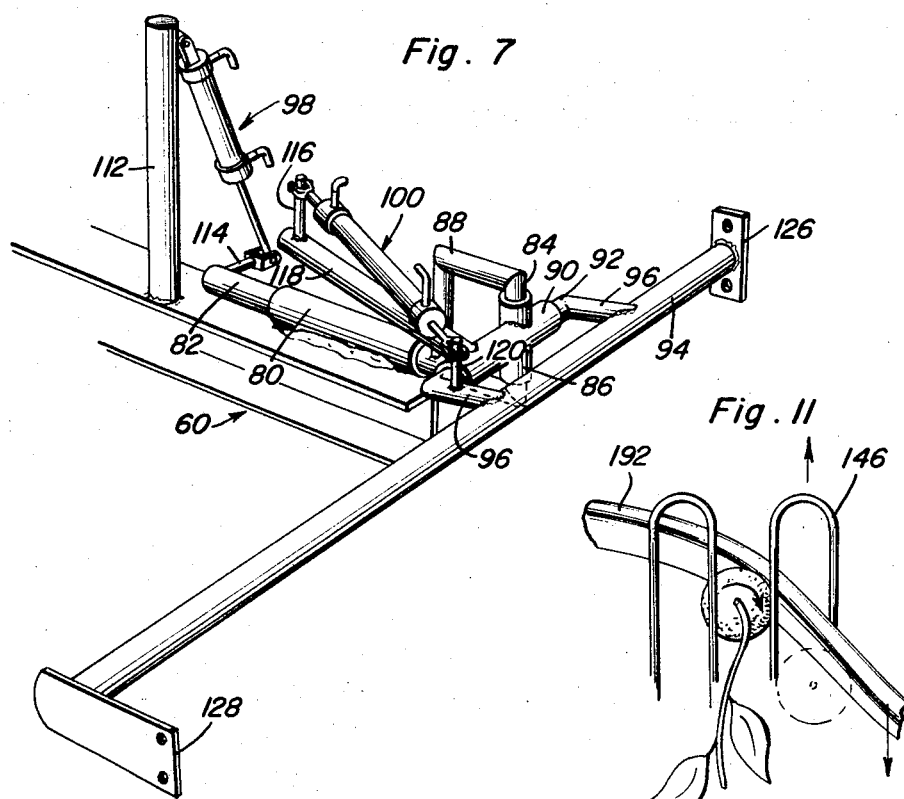
FIGURE 7 is a schematic perspective of various portions of the picker head adjustment means.
Figure 11:
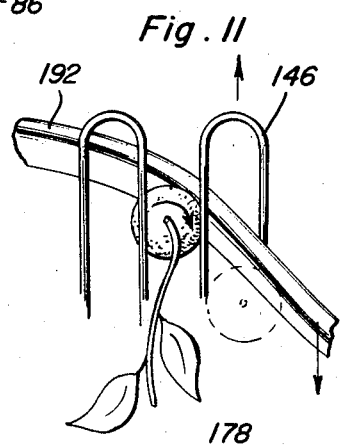
FIGURE 11 is an enlarged detail illustrating the manner in which the individual fruits are to be removed by the operation of the picker head.
Figure 8:
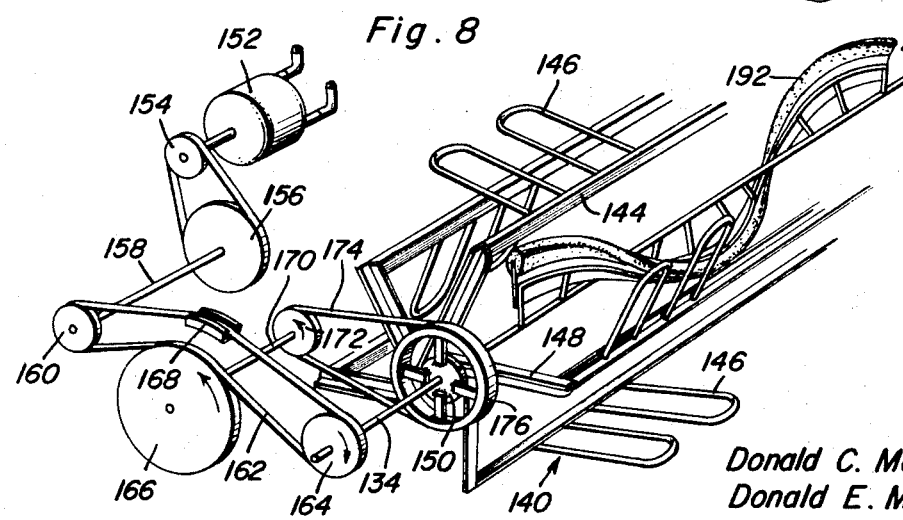
FIGURE 8 is a schematic perspective of the picker head drive means.
Figure 9:
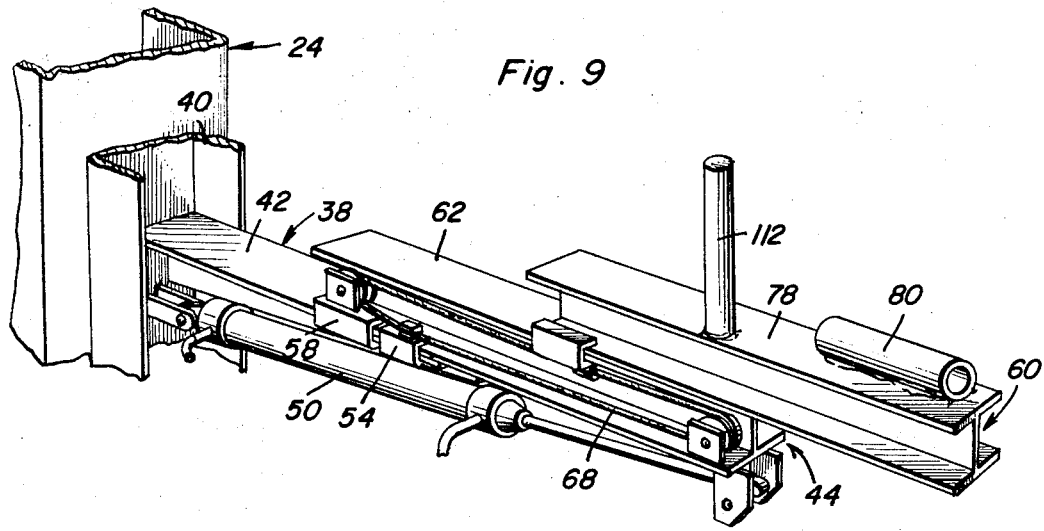
FIGURE 9 is a perspective illustration of the picker head support and the adjustment means therefor.
Figure 10:
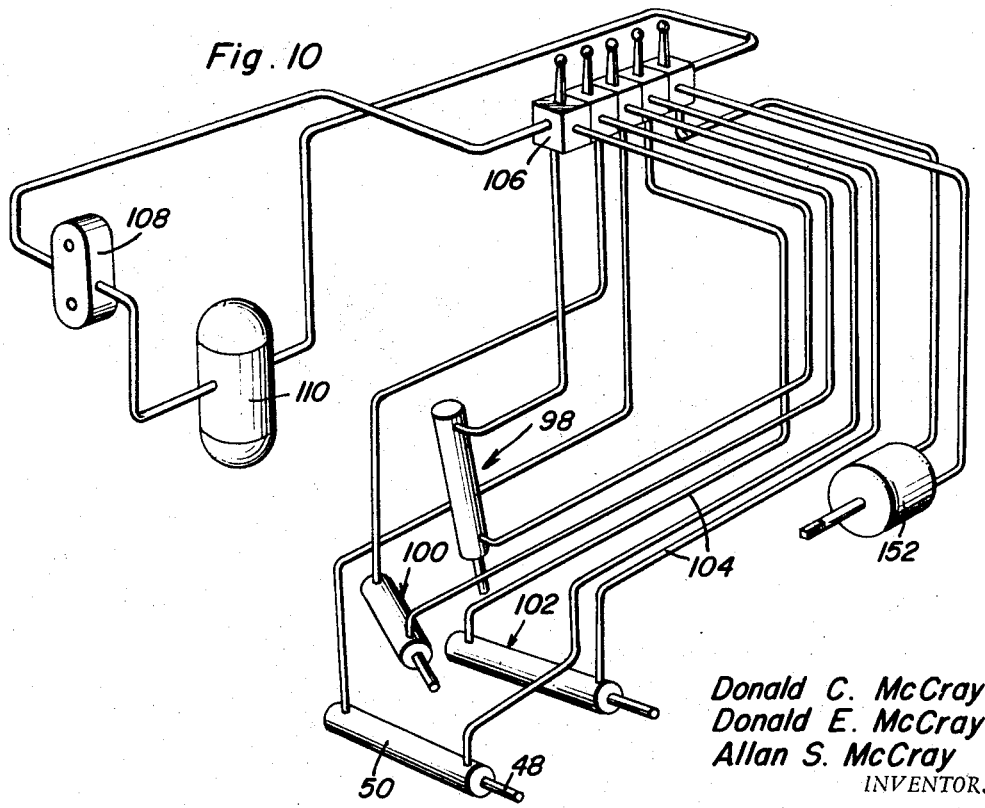
FIGURE 10 is a schematic illustration of the hydraulic system used in connection with the fruit picker of FIGURE 1.

Referring now more specifically to the drawings, and in particular FIGURES 1 through 12, reference numeral 20 is used to generally designate the fruit picker or fruit picking device comprising the present invention. This fruit picking device 20 will generally be mounted upon and adjustable along a vertically orientatable tractor boom 22 through a sliding carriage 24. The carriage 24, as will be appreciated from FIGURE 1, consists of a channel-shaped member having the legs 26 thereof receiving one flange 28 of the I-beam boom 24 therebetween with each flange edge being slidably embraced between a pair of opposed carriage rollers 30, the vertical movement of the carriage being effected through, for example, a power operated hoist chain 32.

Fixed to the carriage 24 and projecting laterally therefrom is a support unit 34 which both supports and enables a horizontal adjustment of the actual picking apparatus or head 36. This support unit 34 includes an elongated T-beam 38 fixedly secured in any suitable manner such as welding to the carriage 24 on the lower portion thereof, the main channel of the carriage 24 having an oppositely directed channel 40 fixed thereto and extending forwardly therefrom for the reception of the secured end of the beam 38 therein so as to rigidify the engagement of the beam 38 with the carriage 24. Paralleling the T-beam 38, and slidably overlying the flat upper flange 42 thereof is an elongated I-beam 44, this I-beam 44 being of a greater length than the T-beam 38 and projecting longitudinally therebeyond. The forwardly projecting portion of the beam 44 includes a depending pivot mount 46 rigidly affixed thereto, this mount 46 pivotally receiving the forward end of a piston 48 which is in turn selectively extended and retracted by means of a hydraulic cylinder 50 the opposite end of which is pivotally engaged to the carriage 24 immediately below the T-beam 38. Thus, as the piston 48 is selectively extended and retracted, through a controlled flow of fluid through the hydraulic lines 52, the beam 44 will be selectively extended and retracted longitudinally relative to the beam 38. The movement of the beam 44 in a longitudinal direction is guided by a first pair of U-shaped lugs 54 welded to the edge portion of the T-beam horizontal flange 42 adjacent the forward end thereof and freely overlying the corresponding edge portion of the bottom flange 56 of the I-beam 44. Likewise, a second pair of lugs 58 are welded to the edge portion of the bottom flange 56 of the beam 44 adjacent the rear end thereof with these lugs 58 encircling the corresponding edge portions of the T-beam flange 42 so as to allow for a free sliding of this flange therethrough. Incidentally, as will be appreciated from FIGURE 9, not only do the U-shaped lugs 54 and 58 provide for a longitudinal guiding of the beam 44 along the beam 38, but they also act as a means for defining the outward limit of the beam 44 through engagement of the lugs 58 fixed to the movable beam 44 with the lugs 54 fixed to the fixed beam 38. A third beam 60, in the nature of an I-beam approximately the same length as the I-beam 44, is mounted on the flat upper flange 62 of the beam 44 for longitudinal sliding therealong. This longitudinal sliding of the beam 60 is guided by means of a pair of opposed U-shaped lugs 64 welded to the edge portion of the lower flange 66 of the beam 60 adjacent the rear end thereof and freely encircling the edge portion of the corresponding edge of the top flange 62 of the beam 44 so as to allow for free sliding movement thereof. The actual extension and retraction of the beam 60 is to be in direct response to the extension and retraction of the beam 44 with the movement of the beam 60 relative to the beam 44 being substantially equivalent to the movement of the beam 44 relative to the beam 38. This is achieved through a pair of control cables 68 orientated on opposite sides of the web 70 of the beam 44. Each of the cables 68 has a portion thereof fixedly eniaged to the beam 38 adjacent the forward end thereof, for example by means of a clamping unit 72 on the corresponding lug 54. From the point of fixed engagement with the beam 38, each of the cables 68 extends both forwardly and rearwardly and, after extending about forward and rear pulleys 74 and 76 rotatably mounted on the beam 44 adjacent the forward and rear ends thereof, is fixedly engaged to the upper beam 60 adjacent the rear end thereof and at a point slightly forward of the rear pulley 76. In this manner, each cable 68 defines a single endless loop engaged about spaced pulleys mounted on the movable central beam 44 and being fixed at one point to the forward end of the lower beam 38 and at another point to the rear end of the upper beam 60. Through this arrangement, it will be appreciated that as the beam 44 is extended through an extension of the piston 48, the cable 68, in light of the two fixed points thereon, will produce a simultaneous extension of the beam 60 relative to the beam 44 in fixed proportion to the length of extension of the beam 44 relative to the beam 38, thus resulting in a horizontal extension of the picker head 36 relative to the boom 22, the picker head 36 being mounted on the upper beam 60 in a manner which shall be described presently.

Fixedly welded to the top flange 78 of the upper beam 60 adjacent the forward portion thereof is an elongated hollow cylindrical sleeve 80 which in turn rotatably receives an elongated rod 82 therethrough. The forward end of the rotatable rod 82 terminates in a vertical rod portion 84 which is rotatably received through a vertical sleeve 86, the upper end of the rod portion 84 being stabilized through a right angular rod section 88 which has one end engaged with the upper end of the rod portion 84 above the sleeve 86 and the other end thereof fixed to the rod 82 just forward of the sleeve 80. A third elongated hollow sleeve 90 is orientated transversely across the vertical sleeve 86 perpendicular to the sleeve 80 with this third sleeve 90 rotatably receiving an elongated rod 92 which in turn has the opposite ends thereof fixedly engaged with an elongated picker head mounting bar 94 through a pair of forwardly directed arms 96, this engagement with the mounting bar 94 being toward one end thereof. While the sleeves 86 and 90 have been illustrated as intersecting each other, thereby necessitating that either the rod portion 84 or the rod 92 be discontinuous so as to allow passage therethrough of the other, these sleeves can be slightly offset so as to avoid the necessity of making either the rod portion 84 or the rod 92 discontinuous.

The rod and sleeve structure described is specifically provided so as to enable an angular adjustment of the picker head 36, rotatably fixed relative to the mounting bar 94, so as to assume substantially any angular orientation. The actual adjustment is effected through a series of hydraulic piston and cylinder units 98, 100 and 102, the extension and retraction of which is effected through suitable hydraulic lines 104 from a central control 106 which in turn is communicated with a suitable pump 108 and fluid reservoir 110.

The unit 98 is mounted on and extends between the upper end of a vertical pedestal 112 fixed to the beam 60, rearward and laterally offset from the sleeve 80, and the outer end of a laterally extending rigid arm 114 fixed to the rear end of the rod 82. In this manner, as the unit 98 is extended and retracted, a rotation of the rod 82, and consequently the mounting bar 94, about a horizontal axis paralleling the beam 60 will be effected.

The unit 100 has a first end thereof pivotally engaged with the upper end of a vertical arm 116 which in turn is welded to a horizontal rod-like bar 118 fixed to the horizontal sleeve 90 and projecting rearwardly therefrom. The opposite end of the unit 100 is pivotally engaged with the upper end portion of a vertical arm 120, the lower end of which is rigidly welded to one of the arms 96 forward of the rod 92 whereby an extension or retraction of the piston of the unit 100 will result in a corresponding rotation of the rod 92 and mounting bar 94 about a second horizontal axis perpendicular to the first mentioned axis of rotation.

The piston and cylinder unit 102 generally parallels the top beam 60 and has the rear end thereof pivotally engaged therewith through a laterally projecting mounting lug 122. The forward end of the unit 102 is in turn pivotally engaged with the outer end of a laterally projecting arm 124 rigidly fixed to the vertical sleeve 86. In this manner, an extension or retraction of the piston of the unit 102 will result in a corresponding rotation of both the vertical sleeve 86 and the mounting bar 94 about a vertical axis defined by the vertical rod portion 84. It will be appreciated that substantially any desired positioning of the picker head 36 will be easily obtained through a combination of any of the aforedescribed available adjustments, including the vertical adjustment achieved through the carriage 24 and the horizontal adjustment achieved through the extensible support unit 34. Further, by engaging the mounting bar 94 toward one end thereof, it will be appreciated that a maximum degree of movement of the picker head 36 will be possible in addition to an extension of a major portion of the picker head laterally outward from the boom 22 and the mounting tractor so as to allow for free movement of the picker head 36 into the foliage.

The elongated mounting bar 94 includes a pair of mounting plates 126 and 128 rigid therewith. The mounting plate 126 in turn fixedly mounts a forwardly extending elongated mounting arm 130 which overlies the adjacent end of an elongated fruit receiving hollow cylindrical drum 132. The arm 130 projects generally radially inward of the adjoining side of the drum 132, where it is fixedly welded thereto, to approximately the longitudinal center line of the drum 132 at which point it receives and rotatably mounts one end of an elongated roller shaft 134. Welded to the forward end of the arm 132 and projecting forwardly therefrom is a rigid U-shaped rod member 136, the bight portion of which is fixedly welded to the drum 132 at a point diametrically opposed to the point at which the arm 130 is itself welded to the drum, thereby fixedly positioning the drum 132 relative to the arm 130 which is in turn rigid with the mounting bar 94.

The mounting plate 128 on the opposite end of the mounting bar 94 also includes an elongated arm 138 rigid therewith, the arm 138 projecting both forwardly in the same manner as the arm 130, and rearwardly from the bar 94. The forward end of the arm 138 rotatably receives and supports the opposite end portion of the roller shaft 134.

Rotatably mounted on the elongated fruit receiving drum 132 is a foliage combing unit 140, this unit 140 including three annular collars 142 encircling the drum 132 and being rotationally slidable relative thereto, the collars 142 being located both at the opposite ends of the drum 132 and at the center thereof. Fixed to the collars 142 and extending thereacross longitudinally of the drum 132 at equally spaced points peripherally thereabout are a plurality of angle bars 144 each of which mount a plurality of longitudinally spaced fingers or finger-like tines or members 146. The collar 142 adjacent the arm 138 has a plurality of inwardly generally radially converging angular spokes 148 fixed thereto, one spoke 148 being in alignment with the adjoining end of each of the angle bars 144. The inner ends of the spokes 148 engage a relatively small disc-like plate 150 and are fixedly secured thereto, the plate 150 in turn being rotatably received over the roller shaft 134.

In the operation of the picker head 36, it is contemplated that the roller shaft 134 and combing unit 140 be rotatably driven in opposite directions, with the shaft 134 being driven at a relatively greater rotational speed than the combing unit 140. The power for the driving of the elements is supplied preferably from a hydraulic motor 152 in communication with the pump 108 and reservoir 110 through the control panel 106. The drive pulley 154 of the motor 152 chain drives an enlarged pulley 156 which in turn drives, through a common shaft 158, a reduced pulley or gear 160. An endless chain 162 is positioned about the gear 160 and a similar gear 164 fixed to the outer end portion of the shaft 134 outward of the arm 138, thereby effecting a driving of the shaft 134. The lower run of the chain 162 engages over the upper portion of an enlarged gear 166 prior to continuing under the gear 164, thereby effecting a rotation of the gear 166 in a direction opposite from that of the gear 164. The upper run of the chain 162 engages over an idler block 168. The enlarged gear 166 in turn drives, through a common shaft 170, a reduced gear 172 with the reduced gear 172 driving, through an endless chain 174, an enlarged gear 176 rotatably mounted about the shaft 134 and fixedly secured to the disc-like plate 150 which is in turn rigid with the combing unit 140. In this manner, it will be appreciated that a reverse rotation of the combing unit 140 relative to the shaft 134 will be effected. It will of course be appreciated that pulleys and belts and gears and chain can be interchangeably used for the drive train as desired.

Figure 16:
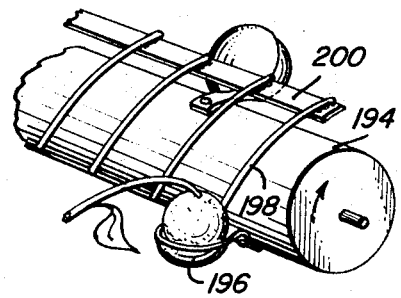
FIGURE 16 illustrates a modified form of fruit gripping roller such as can be used with the various picking heads illustrated in the remaining figures.

In use, as the picker head 36 is introduced into fruit bearing foliage, it is basically contemplated that the foliage comb unit 140 will properly position the fruit for engagement by the internal roller 178 through the elongated opening 180 provided in the top of the drum 132 and extending along a major portion of the length thereof, the opening 180 being defined by a front edge 182 and a straight rear edge 184. The roller 178, while it can have various configurations, should include a relatively soft gripping surface or edge capable of firmly gripping and guiding the fruit along a twisting path so as to sever the fruit from the stems in a gentle manner. The particular roller 178 illustrated in FIGURES 1–11 includes a spiral or serpentine rigid rod 186 coiled about the shaft 134 and fixed relative thereto by a plurality of short rod-like braces 188. Welded to the rod 186 and the associated braces 188 is an elongated similarly curved flat plate 190, the outer edge of which is spaced outwardly from the rod 186 and is encased within a fruit gripping and cushioning resilient edge member 192 which sweeps about the interior of the drum 132 as the shaft 134 rotates. A modified form of roller is illustrated in FIGURE 16 wherein the roller 194 is cylindrical in shape and provided with a plurality of cup-like receptacles 196 into which the fruit is guided by single rod slightly arcuate foliage combing and fruit guiding fingers 198, the fruit in this instance being twisted downwardly past the finger mounting bar 200 which completes the severing of the stem.

Referring specifically to the operation of the unit disclosed in FIGURES 1–11, as the picker head 36 is introduced into the fruit bearing foliage, the rotating comb unit 140 will comb through the foliage with the fruit being received between the adjoining combing finger s 146, which in this particular instance consists of U-shaped rods having the arcuate bight portion thereof extending forwardly in order that the individual fruit might ride smoothly into the space between the adjoining fingers 146. The fruit is then carried about the drum 132 to the enlarged upper opening 180 therein. At some point along the travel of the fruit over the opening 180, it is contacted by the soft edge or face 192 of the roller 178 with the roller 178 effecting a firm grip on the fruit and, through the opposite rotational movement of the roller 178, a rolling or twisting of the fruit rearwardly toward the corresponding finger mounting angle bar 144 which acts in the manner of a breaker bar so as to complete, if necessary, the severing of the fruit stem. While the breaker bar action will in many instances complete the severing of the fruit from the stem, it is contemplated that a major portion of the actual severing be effected by the rolling twisting action of the fruit itself resulting from the oppositely moving comb unit 140 and roller 178. Further, it will be appreciated that the rear edge 184 of the opening 180 will also function in the manner of a breaker bar should the fruit stem be engaged thereagainst by the roller 178. One particular advantage in utilizing the specific roller illustrated in FIGURES 1–11 resides in the fact that there will also be a tendency for the fruit to twist sideways in addition to the rolling of the fruit along the path of travel, this being generally indicated schematically in FIGURE 11. In addition, inasmuch as the spacing between the comb fingers 146 is provided so as to accommodate the fruit itself, the foliage will normally pass completely therethrough, thereby avoiding any possibility of damage thereto such as might effect the fruit bearing ability of the tree. Furthermore, if so desired, the individual fingers 146 can be adjustably mounted whereby the spacing therebetween can be varied so as to accommodate different size fruits.

As will be appreciated from the drawings, the end of the drum 132 adjacent the arm 130 is relatively open. Accordingly, a discharge chute or the like can be easily attached thereto so as to enable a disposal of the picked fruit to a central collection point, normally a bin on the tractor itself. A relatively low generally arcuate plate 202 is fixed within the drum 132 adjacent the arm 130, this plate 202 facilitating the mounting of a conveying tube and acting in the manner of a fruit stop over which the fruit must be raised by the roller 178 so as to effect the discharge thereof. It will also be appreciated that this plate 202 acts so as to rigidify the drum 132 and stabilize the shape thereof.

Figure 12:
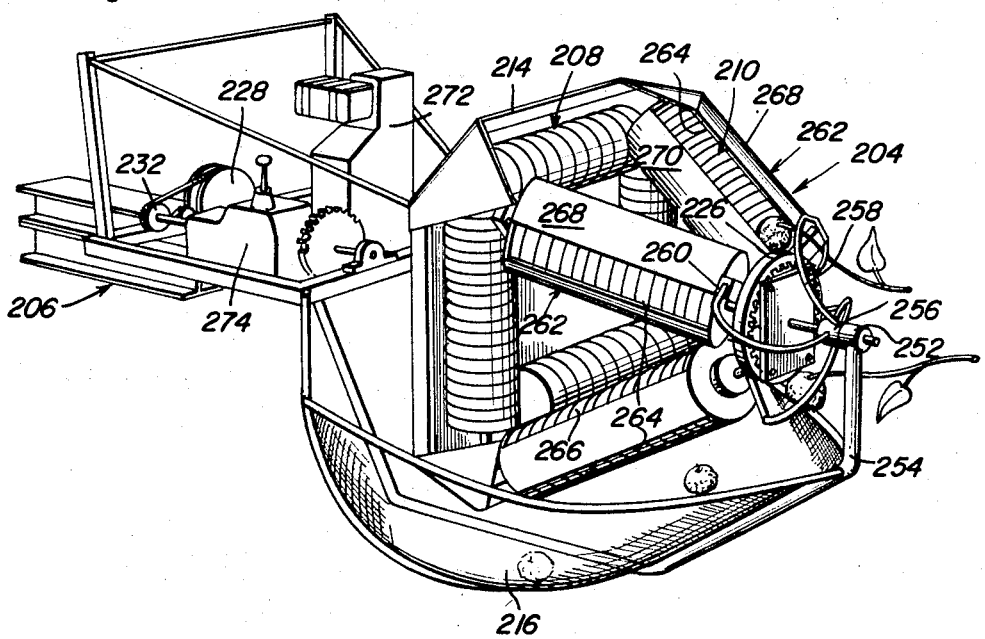
FIGURE 12 is a perspective view of a modified form of fruit picker.
Figure 13:
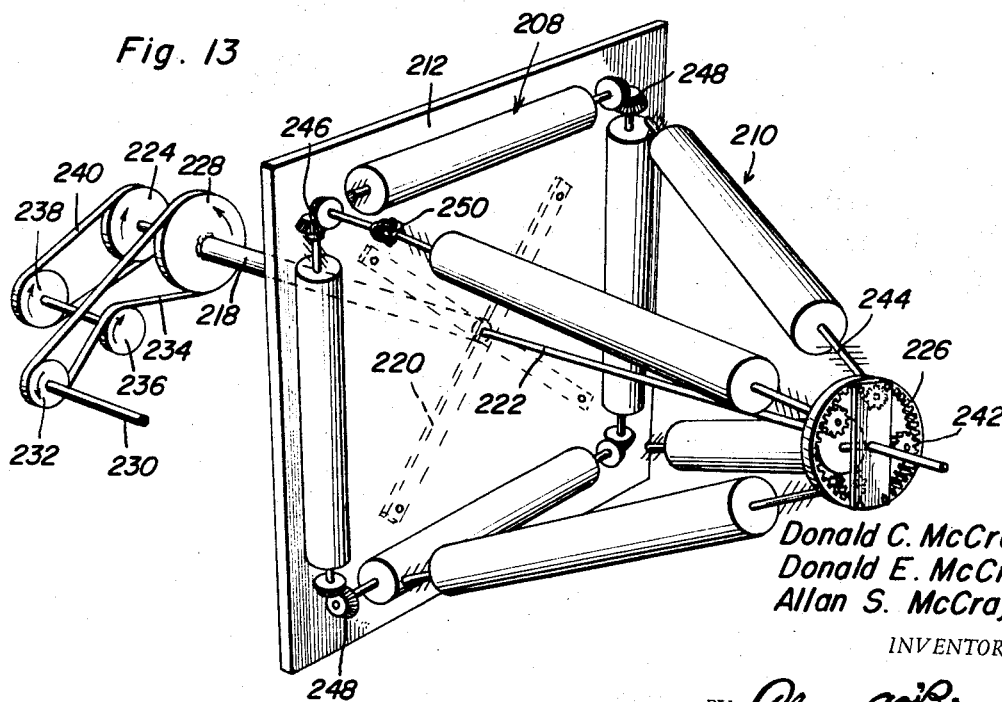
FIGURE 13 is a schematic perspective illustrating the operative relationship of the elements of the picking device of FIGURE 12.

Referring now specifically to FIGURES 12 and 13, it will be noted that a modified form of picker head 204 has been illustrated therein, this picker head 204 being mounted on a support unit 206 similar to the unit 34 described supra. This picker head 204 while normally fixed to the support unit 206 against angular adjustment thereto, such adjustment not being considered necessary due to the multi-directional rollers, can if so desired be fixed to an adjustable mounting bar similar to mounting bar 94. The picker head 204 differs from the picker head 36 in that the head 204 incorporates a plurality of rollers, more particularly four right angularly related coplanar rollers 208 and four additional rollers 210 converging forwardly from the four corners of the first four rollers. However, each of the rollers 208 and 210 incorporates the significant basic features of the roller construction of FIGURES 1–11 including the soft fruit gripping and twisting surfaces thereon and the relationship to the corresponding oppositely moving fruit receiving drum cooperating with the individual rollers so as to produce a stem twisting off effect. In addition, the picker head 204 also incorporates a foliage combing and fruit guiding construction so as to effect a proper introduction of the fruit with a minimum amount of damage to the foliage itself.

The four coplanar rollers 208 are orientated generally in a square and are rotatably mounted on the forward face of an enlarged base 212 by suitable bearing blocks not illustrated. These rollers 208 rotate outward relative to the adjoining edges of the base 212 which are provided with arcuate partial shields 214 which in turn present leading edges against which the fruit can be twisted by the rollers 208 and the stems severed so as to allow the fruit to fall freely into a fruit catcher or basket 216 mounted beneath the picking head 204. In addition, the entire picking head 204 is rotated in a counterclockwise direction while each of the individual forwardly converging rollers 210 are rotated clockwise.

The driving of the picker head 204 itself is achieved through an elongated tubular shaft 218 fixed, through a pair of crossed bracing rods 220, centrally to the rear of the baseboard 212. The driving of the rollers, both 208 and 210 is achieved through an elongated axle 222 rotatably received through the shaft 218 and projecting rearwardly therefrom for fixed engagement with a driven gear 224, and forwardly therefrom for fixed engagement with an enlarged ring gear 226 forward of the forward ends of the converging rollers 210. Both the axle gear 224 and the gear 228 fixed to the shaft 218 are driven from a common drive shaft 230 and drive gear 232, the endless chain 234 being engaged about the gears 232 and 228 with the lower run of the chain 234 drivingly engaged over a gear 236 which drives, through a common shaft, the gear 238 drivingly connected to the gear 224 through the chain 240.

The enlarged ring gear 226 is drivingly engaged with internally located spur gears 242, one fixed to each of the roller shafts 244 of the rollers 210, these shafts 242 of course being suitably rotatably supported within the picker head 204 in any practical manner. The driving of the rear rollers 208 is effected through a miter gear engagement 246 between one of the converging roller shafts 244 and the right hand end of one of the shafts of the rollers 208 with driving miter gear connections 248 being similarly provided between the remaining three corners defined by the rectangular related rollers 208, thereby providing for a driving of all four of the rollers from the single drive transferring roller 210 the shaft of which will include a universal connection 250 therein so as to insure proper transfer of the driving force to the rear rollers 208.

The forward end of the shaft 222 can be rotatably supported within a socket 252 defined on the forward end of a support bar 254 which curves under the picker head 204 and constitutes a portion of the supporting framework for the screen-like fruit catching basket 216. Just inward of the sleeve 252 is a rotatably mounted collar 256 to which is fixed the forward end of a plurality of curved fruit guiding and comb defining rods 258, these rods 258 bowing toward the direction of travel of the picker head 204 with each having the inner end 260 fixed adjacent to one of the rollers 210 and more particularly to the drum defining portion 262 thereover rearward of the elongated fruit receiving opening 264 therein. Each drum also includes a second elongated opening 266 diametrically opposed from the opening 264 with the drum 262 itself being fixed relative to the corresponding roller and actually being defined by a pair of opposed arcuate portions 268 and 270 supported in any appropriate manner in spaced overlying relation to the corresponding roller.

Each of the comb fingers or rods 258 leads rearwardly to the fruit receiving opening 264 forward of the leading or breaking edge of the drum portion 268 thus enabling a guiding of the individual fruit along one of the comb fingers 258 and into the fruit receiving opening 264 where it is gripped by the roller 210 itself and, through engagement with the leading portion of the drum section 268 rolled or twisted in a manner so as to tend to sever the stem, the leading edge of the section 268, which may be reinforced if so desired, acting in the manner of a breaker bar so as to complete the severing of the stem if necessary. At the same time, the portion 270 functions in the manner of a foliage guard or protector tending to exclude the foliage from gripping engagement with the roller 210. After the fruit has been properly severed, it will be deposited in the collector basket 216 through the lower drum opening 266, this collector basket 216 being communicated, if so desired, with a suitable fruit discharging chute engaged with the lower rear portion thereof. It will be noted that FIGURE 12 illustrates the power source or motor 272 and a suitable transmission 274 mounted on a control platform immediately to the rear of the picker head 204 so as to allow a control of the movement of the picker head directly from the elevated picker head itself.

As will be appreciated from the above description, the rotating generally conically shaped picker head is adapted to engage with and within fruit bearing foliage from a plurality of angles and in a manner so as to have maximum picking contact therewith, the fruit being smoothly guided, through the forwardly projecting combing unit, into the picking rollers. Incidently, it will of course be appreciated that the portions 268 of each of the individual roller elements can be provided with individual combing fingers of the type illustrated in conjunction with the single roller of FIGURES 1–11.

Figure 14:
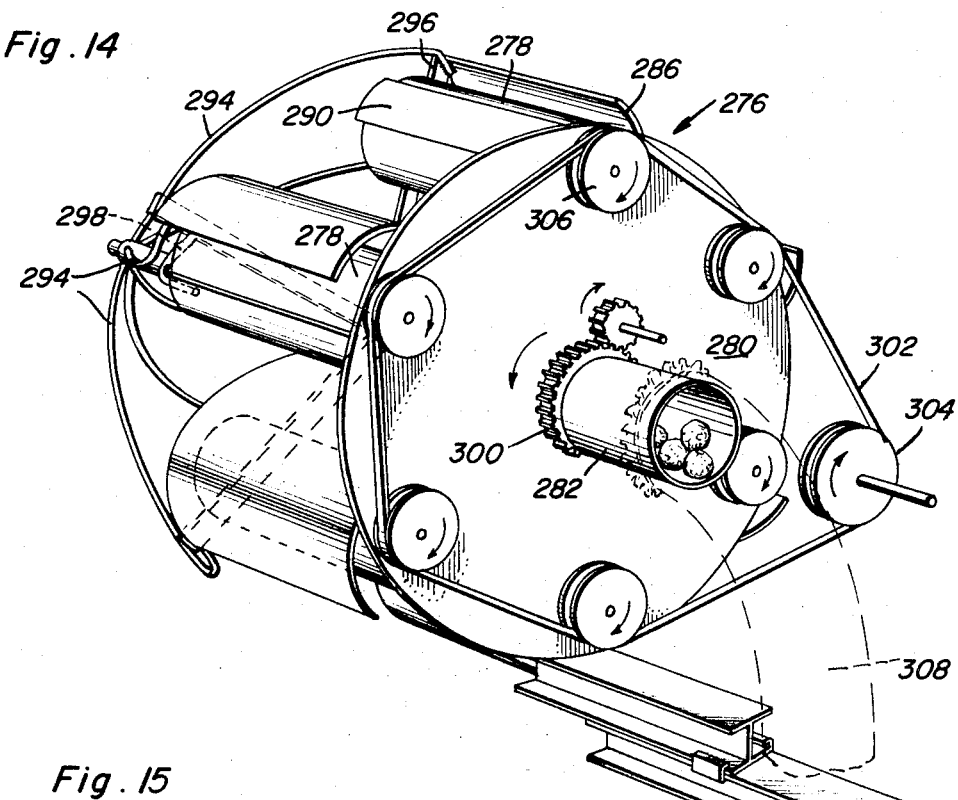
FIGURE 14 is a perspective illustration of yet another modified form of the fruit picking device of the instant invention.
Figure 15:
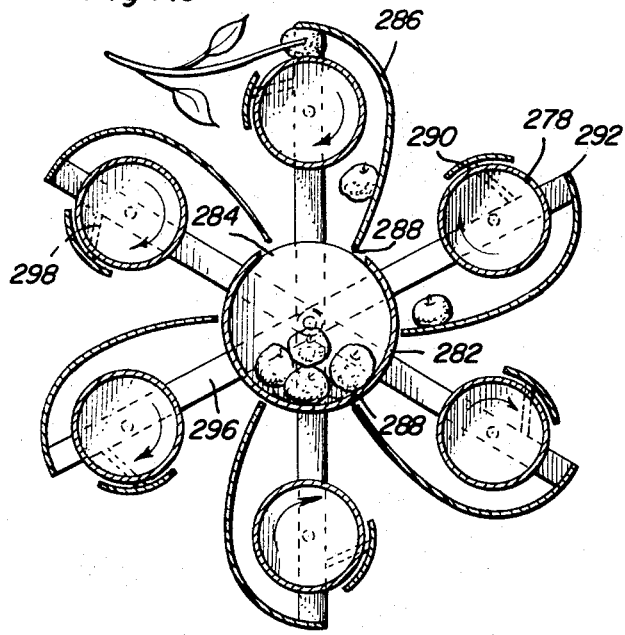
FIGURE 15 is a cross-sectional view through the picking device of FIGURE 14.

Referring now more specifically to FIGURES 14 and 15, it will be noted that a modified form of the multi-roller picker head has been illustrated therein, this modified form of picker head being generally designated by reference numeral 276. The rollers 278 of the head 276 extend forwardly from a circular back panel 280 in parallel peripherally spaced relation to each other. Extending centrally through the back panel 280 and forwardly centrally between the rollers is an enlarged hollow tubular fruit collector 282 having an elongated fruit receiving opening 284, of the length approximately equal to the length of the rollers 278, through the upper portion thereof. The drum defining portion of each of the rollers 278 includes an elongated wide deflector 286 which arcs about the corresponding roller 278 and has the trailing edge 288 thereof located closely adjacent the cylindrical collector 282. In addition, the drum portion of each of the rollers 278 includes a foilage deflector or protector 290, also arcuate and substantially narrower than the deflector 286, the protector 290 being located forward of the outer or leading edge 292 of the corresponding deflector 286 so as to expose a portion of the corresponding roller 278 for reception of the fruit.

The fruit will be guided to the rollers 278 by means of a forwardly projecting comb unit consisting of a plurality of individual arcuately bowed fingers 294, one finger leading to each of the rollers forward of the leading edge 292 of the corresponding deflector 286, much in the manner of the device of FIGURE 12. The forward ends of the deflectors 286 can be supported in any suitable manner such as by means of a plurality of radially extending arms 296 fixed to the outer end of the collecting cylinder 282. By the same token, the foliage protectors 290 can be fixed to the corresponding arm 296 by means of a rigid bracing arm 298. In turn, the inner ends of both the deflectors and protectors can be fixedly engaged directly with the back panel 280. The forwardly positioned arcuately converging ends of the comb fingers or rods 294 can be fixed to a stub shaft projecting from the forward end of the central collector 282, these fingers 294 bowing in the direction of rotation of the picker head 276 so as to smoothly guide the fruit to the corresponding rollers 278, with the rear ends of the fingers 294 being fixed to the leading edges of the deflectors 286.

It is contemplated that the picker head 276 be rotated in a first direction about the collecting tube 282, this being achieved by an enlarged ring gear 300 fixed to the back panel 280 about the collector 282 and suitably driven. At the same time, each of the rollers 178 is to be driven in the opposite direction, one manner of achieving this being illustrated in FIGURE 14 wherein a single endless chain 302 extends from a driving wheel 304 about driven wheels 306 fixed to the rear ends of each of the roller shafts. This simplified driving arrangement for the individual rollers 278 will result in a temporary driving disengagement of one or more rollers as will be appreciated from FIGURE 14, however, this will not appreciably affect the picking ability of the head 276.

In operation, as the picker head 276 is introduced into the fruit bearing foilage and rotated in a first direction, the fruit is smoothly guided into the rollers 278 by the comb fingers 94 at which point the individual roller 278 grips the fruit and, upon engagement of the fruit with the leading breaker bar forming edge of the corresponding fruit deflector 286, produces a twisting of the fruit which either itself, or through engagement with the breaker bar, effects a snapping of the stem. The fruit is then free to follow the deflector 286 and, upon communication of the inner edge 288 of the deflector with the open top 284 of the collector 282, the fruit is deposited therein for discharge through the rear end thereof down a suitable chute or conveyor 308. In order to facilitate the discharge of the fruit, it is contemplated that the leading or forward end of the picker head 276 be elevated slightly, for example at approximately 15°. As the fruit is being received by the roller, the foliage deflector 290 acts so as to exclude and protect the foliage, thus insuring the productivity of the tree and the substantially foliage free collection of the fruit. The picker head 276 can of course be mounted on an adjustable support unit 310 similar to the unit 34 described supra.

From the foregoing, it should be appreciated that several significant common features are present in the picker heads of the instant invention, including the rotation of the picker head and roller or rollers in opposite directions so as to produce a positive grasping and twisting movement of the fruit, and the incorporation of fruit guiding comb-like units for initially contacting the fruit and properly directing the fruit into the rollers with the actual removal of the fruit being for the most part effected gently through a twisting of the fruit from the stem, each roller drum having a breaker bar means so as to assist in the final severing of the stem if necessary. Likewise, means have been provided so as to exclude and protect foliage from the roller, this being effected from the particular nature of the comb units or through the provision of separate plate-like portions overlying the forward portions of the rollers. In addition, each picker head is mounted on a support unit with the individual rollers being so orientated so as to obtain the maximum benefit therefrom in that introduction into the fruit bearing foliage from a variety of angles is possible, thus insuring a proper collection of all of the fruit in a thorough and gentle manner.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to.

What is claimed as new is as follows:

1. In a fruit picker, a support, picking head means mounted on said support, means for continuously rotating said picking head means in a first direction on said support, at least one elongated roller rotatably mounted within said picking head means, means for rotating said roller in a second direction opposite from the direction of rotation of the picking head means, means on said picking head means cooperatively associated with said roller for effecting a twisting movement of fruit therebetween, drum-like means surrounding said roller within said picking head means, said roller being rotatable with said drum-like means, and a fruit receiving opening defined within said drum-like means and exposing said roller, said picking head means being rotatable about said drum-like means, said means associated with said roller for effecting a twisting movement of the fruit including a combing unit comprising at least one row of elongated fingers fixed to the picking head means at a plurality of longitudinally spaced points therealong, said fingers projecting outwardly at an acute angle relative to said drum-like means and toward the direction of rotation of said picking head means, said fingers, upon a rotation of said picking head means, moving across the fruit receiving opening and the roller exposed therethrough.

2. The structure of claim 1 wherein the outer ends of said fingers are spaced from the drum-like means a distance sufficient so as to accommodate fruit therebetween, the space between adjacent fingers being sufficient to receive fruit stems while preventing passage of the fruit upward therethrough so as to retain the fruit against the oppositely rotating roller through said fruit receiving opening.

3. The structure of claim 2 including means for selectively adjusting said picking head means, drum-like means and roller about two perpendicularly related horizontal axes and one vertical axis.

4. In a fruit picker, a support, picking head means mounted on said support, means for continuously rotating said picking head means in a first direction on said support, at least one elongated roller rotatably mounted within said picking head means, means for rotating said roller in a second direction opposite from the direction of rotation of the picking head means, means on said picking head means cooperatively associated with said roller for effecting a twisting movement of fruit therebetween, a plurality of forwardly projecting rollers, the means associated with each roller for effecting a twisting movement of the fruit comprising an arcuate panel-like portion overlying each roller, and means on said picking head means for guiding fruit onto the rollers ahead of the associated panel-like portions for movement of the fruit under the adjoining edges of the portions through rotation of the rollers.

5. The structure of claim 4 wherein said fruit guiding means comprises a comb unit formed of a plurality of forwardly converging rod-like members, each having the rear portion thereof fixed adjacent the fruit entering edge of a panel-like portion.

6. In a fruit picker, a support, a picking head, said picking head including an elongated open top drum, an elongated roller mounted in said drum for rotation in a first direction, said roller being exposed through the open top of the drum, a fruit combing unit mounted over said drum for rotation in a second direction opposite said first direction, said combing unit including at least one elongated bar positioned longitudinally along said drum and movable thereabout so as to periodically pass over the open top of the drum, and a plurality of fruit receiving fingers projecting laterally from said bar at longitudinally spaced points therealong and in the direction of movement of said bar, said fingers extending from said bar at an outwardly directed angle relative to said drum so as to effect an inward movement of received fruit toward said drum and through the open top for rolling engagement by said roller.

7. The structure of claim 6 wherein said combing unit includes a plurality of finger carrying bars peripherally spaced about said drum and progressively passed over said open top.

8. The structure of claim 7 including means mounting said picking head on said support for adjustment relative thereto about first and second horizontal axes and about a vertical axis.

9. The structure of claim 7 wherein said support includes a vertical member, a first horizontal beam fixed to said vertical member, a second horizontal beam slidably mounted on said first beam, a third horizontal beam slidably mounted on said second beam, means for effecting an extension of said second beam relative to said first beam, and means operatively associated with said beams for effecting a coordinated extension of the third beam relative to the second beam in response to an extension of the second beam.

10. The structure of claim 9 wherein said last mentioned means includes an endless cable engaged about forward and rear pulleys on the second beam, the lower run of said cable being fixed to the first beam, and the upper run of said cable being fixed to said third beam.

11. In a fruit picker, a rotatable picking head, said picking head comprising a plurality of forwardly extending rollers orientated in equally spaced relation about the axis of rotation of the head, means for rotating said head in a first direction, means for rotating each individual roller in a direction opposed to the direction of rotation of the head, fruit guiding means mounted on and rotatable with said head forward of said rollers, said guiding means comprising a plurality of arcuate forwardly converging rods, one extending forward from overlying relation with each roller, and a fruit receiving arcuate panel-like portion extending over each roller forward of the inner end of the corresponding rod along the rotational path of the roller for reception of fruit therebeneath.

12. The structure of claim 11 including additional rollers, said additional rollers extending between the rear ends of adjacent ones of the first mentioned rollers, one of said additional rollers being drivingly engaged with one of said first mentioned rollers, the remainder of said additional rollers being drivingly engaged in series with said one additional roller.

13. The structure of claim 11 wherein said first mentioned rollers converge forwardly toward each other, and a fruit collection basket mounted beneath said picking head.

14. The structure of claim 11 including an open top fruit collecting tube centrally through said picking head, each panel-like portion extending from the corresponding roller to a point immediately adjacent said collecting tube so as to selectively communicate the panel-like portion with the interior of the tube through the open top thereof.

15. The structure of claim 11 including a foliage protecting second panel-like portion extending over each roller rearward of the inner end of the corresponding rod in spaced relation to said first mentioned panel-like portion along the rotational path of the roller.

References Cited

UNITED STATES PATENTS

| | | | |
|---|---|---|---|
| 3,138,912 | 6/1964 | Mays et al. | 56—328 |
| 3,153,311 | 10/1964 | Pool | 56—328 |
| 3,247,658 | 4/1966 | Peacock | 56—328 |

HUGH R. CHAMBLEE, *Primary Examiner.*